(12) United States Patent
Feng et al.

(10) Patent No.: US 10,440,696 B2
(45) Date of Patent: Oct. 8, 2019

(54) METHOD FOR TRANSMITTING FEEDBACK INFORMATION, TERMINAL EQUIPMENT AND BASE STATION

(71) Applicant: GUANGDONG OPPO MOBILE TELECOMMUNICATIONS CORP., LTD., Dongguan, Guangdong (CN)

(72) Inventors: Bin Feng, Dongguan (CN); Hai Tang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 15/741,625

(22) PCT Filed: Oct. 22, 2015

(86) PCT No.: PCT/CN2015/092500
§ 371 (c)(1),
(2) Date: Jan. 3, 2018

(87) PCT Pub. No.: WO2017/066950
PCT Pub. Date: Apr. 27, 2017

(65) Prior Publication Data
US 2018/0199333 A1    Jul. 12, 2018

(51) Int. Cl.
*H04W 72/04* (2009.01)
*H04L 5/14* (2006.01)
(Continued)

(52) U.S. Cl.
CPC ......... *H04W 72/0413* (2013.01); *H04L 5/001* (2013.01); *H04L 5/0055* (2013.01);
(Continued)

(58) Field of Classification Search
CPC ........... H04W 72/0413; H04W 72/044; H04W 88/08; H04W 88/02; H04L 5/0057;
(Continued)

(56) References Cited

U.S. PATENT DOCUMENTS 8,837,450 B2   9/2014  Papasakellariou
9,184,890 B2  11/2015  Papasakellariou et al.
(Continued)

FOREIGN PATENT DOCUMENTS

CN    101527886 A    9/2009
CN    101527936 A    9/2009
(Continued)

OTHER PUBLICATIONS

English Translation of International Search Report in international application No. PCT/CN2015/092500 dated Jul. 13, 2016.
(Continued)

*Primary Examiner* — Tejis Daya

(57) ABSTRACT

The disclosure discloses a method for transmitting feedback information, terminal equipment and a base station. The method includes that the terminal equipment receives signaling indicative of Physical Uplink Control Channel (PUCCH) resource(s) from the base station, receives data on licensed carrier(s) and unlicensed carrier(s) which are aggregated, and after generating the feedback information, transmits the feedback information to the base station through the corresponding PUCCH resource(s). The problem that the base station in a License Assisted Access (LAA) system may not know about the feedback information transmitted by the terminal equipment may be solved, thereby increasing efficiency of feedback information transmission.

20 Claims, 13 Drawing Sheets

(51) Int. Cl.
*H04L 5/00* (2006.01)
*H04L 27/00* (2006.01)
*H04W 88/02* (2009.01)
*H04W 88/08* (2009.01)

(52) U.S. Cl.
CPC .......... *H04L 5/0057* (2013.01); *H04L 5/0092* (2013.01); *H04L 5/0098* (2013.01); *H04L 5/14* (2013.01); *H04L 27/0006* (2013.01); *H04W 72/044* (2013.01); *H04L 5/1469* (2013.01); *H04W 88/02* (2013.01); *H04W 88/08* (2013.01)

(58) Field of Classification Search
CPC ..... H04L 5/0098; H04L 5/0092; H04L 5/001; H04L 27/0006; H04L 5/0055; H04L 5/14; H04L 5/1469
See application file for complete search history.

(56) References Cited

U.S. PATENT DOCUMENTS

| | | | |
|---|---|---|---|
| 2011/0110405 | A1 | 5/2011 | Lee |
| 2011/0235534 | A1 | 9/2011 | Ratasuk |
| 2012/0034927 | A1 | 2/2012 | Papasakellariou |
| 2014/0036818 | A1 | 2/2014 | Koskela et al. |
| 2015/0003382 | A1 | 1/2015 | Papasakellariou et al. |
| 2015/0181453 | A1 | 6/2015 | Chen et al. |
| 2016/0065349 | A1 | 3/2016 | Papasakellariou et al. |
| 2016/0135143 | A1* | 5/2016 | Won ................ H04W 72/005 370/312 |
| 2016/0226629 | A1* | 8/2016 | Liu ................ H04L 1/1861 |
| 2016/0227578 | A1* | 8/2016 | Lee ................ H04W 74/004 |
| 2016/0233989 | A1* | 8/2016 | Belghoul ............ H04L 1/1887 |

FOREIGN PATENT DOCUMENTS

| | | |
|---|---|---|
| CN | 102845015 A | 12/2012 |
| CN | 103068047 A | 4/2013 |
| CN | 103856953 A | 6/2014 |
| CN | 104348589 A | 2/2015 |
| EP | 2418901 A2 | 2/2012 |
| EP | 3026838 A1 | 6/2016 |
| WO | 2015109571 A1 | 7/2015 |

OTHER PUBLICATIONS

The Written Opinion of the International Search Authority in international application No. PCT/CN2015/092500, dated Jul. 13, 2016.

Supplementary European Search Report in European application No. 15906468.2, dated Nov. 13, 2018.

CMCC: "PUCCH format design for CA up 32 CCs", 3GPP Draft; R1-155764, 3rd Generation Partnership Project (3GPP), Mobile Competence Centre; 650, Route Des; Lucioles; F-06921 Sophia-Antipolis Cedex;France, vol. RAN WG1, No. Malmo, Sweden; Oct. 5, 2015-Oct. 9, 2015 Oct. 4, 2015 (Oct. 4, 2015), XP051039752,Retrieved from the Internet: URL:http://www.3gpp.org/ftp/Meetings_3GPP_SYNC/RAN1/Docs/ [retrieved on Oct. 4, 2015]* Section 2, 3 *.

* cited by examiner

METHOD FOR TRANSMITTING FEEDBACK INFORMATION, TERMINAL EQUIPMENT AND BASE STATION

RELATED APPLICATION

This application is an application under 35 U.S.C. 371 of International Application No. PCT/CN2015/092500 filed on Oct. 22, 2015, the entire contents of which are incorporated herein by reference.

TECHNICAL FIELD

Embodiments of the disclosure relate to communications, and particularly to a method for transmitting feedback information, terminal equipment and a base station.

BACKGROUND

On one hand, a Physical Downlink Share Channel (PDSCH) in a Long Term Evolution (LTE) system supports a Hybrid Automatic Repeat Request (HARQ) function. After establishing a communication connection with a base station, terminal equipment receives Downlink Control Information (DCI) and acquires scheduling information (which may include, for example, locations and the number of physical resource(s), a modulation and coding level and the like) corresponding to the PDSCH. The terminal equipment receives the PDSCH according to the scheduling information, and demodulates and decodes a Transport Block (TB) carried therein. If a decoding result is correct, the terminal equipment may feedback Acknowledgement (ACK) information to the base station. If the decoding result is incorrect, the terminal equipment may feedback Negative Acknowledgement (NACK) information to the base station, and then the base station retransmits the TB.

The ACK information or the NACK information may be transmitted through a Physical Uplink Share Channel (PUSCH) or a Physical Uplink Control Channel (PUCCH). When the terminal equipment has no PUSCH transmitted in an uplink subframe, the ACK information or NACK transmitted in the subframe may only be transmitted through the PUCCH.

On the other hand, the LTE system may use a Carrier Aggregation (CA) technology to implement bandwidth extension, that is, multiple LTE Component Carriers (CCs) are aggregated to achieve a larger transmission bandwidth.

For the CA technology, a conventional art discloses a License Assisted Access (LAA) technology to implement aggregation of a licensed carrier and an unlicensed carrier. For an unlicensed carrier in an LAA system, the base station completes preparations (coding, modulation, resource mapping and the like) for data in a subframe, but it is uncertain about the specific subframe on which the data is transmitted, that is, the base station may not completely know about a scheduling condition on each carrier in any downlink subframe. Therefore, the base station may not set information in the DCI to indicate an amount of feedback information (ACK information or NACK information) required to be fed back by the terminal equipment, which lowers efficiency of feedback information transmission between the base station and the terminal equipment.

SUMMARY

The embodiments of the disclosure provide a method for transmitting feedback information, terminal equipment and a base station, which may increase efficiency of transmitting feedback information.

A first aspect provides a method for transmitting feedback information, including that terminal equipment receives a first signaling transmitted by a base station, the first signaling being configured to indicate K first PUCCH resource(s), wherein K may be a positive integer. In a first downlink subframe set, the terminal equipment respectively receives data on licensed carrier(s) and unlicensed carrier(s) which are aggregated, determines N-bit feedback information for the licensed carrier(s), and determines M-bit feedback information for the unlicensed carrier(s), wherein M may be an integer more than or equal to 0, N may be an integer more than or equal to 0, and at least one of M and N may not be 0. The terminal equipment judges whether a value of M is more than 0 or not; and when M is more than 0, the terminal equipment transmits the M-bit feedback information and the N-bit feedback information on L first PUCCH resource(s) in the K first PUCCH resource(s) in a first uplink subframe (a joint PUCCH resource solution). Or, the terminal equipment transmits the N-bit feedback information on at least one second PUCCH resource and transmits the M-bit feedback information on the L first PUCCH resource(s) in the K first PUCCH resource(s) in the first uplink subframe (an independent PUCCH resource solution), wherein L may be a positive integer less than or equal to K, and the at least one second PUCCH resource may be determined according to DCI configured for scheduling data transmission on the licensed carrier(s), wherein the first downlink subframe set includes all downlink subframes corresponding to the first uplink subframe for transmitting the feedback information.

In an implementation mode of the first aspect, the method may further include that, when M is equal to 0, the terminal equipment transmits the N-bit feedback information on the at least one second PUCCH resource in the first uplink subframe, wherein the at least one second PUCCH resource may be determined according to the DCI configured for scheduling data transmission on the licensed carrier(s).

In the joint PUCCH resource solution, the feedback information corresponding to the licensed carrier(s) and the feedback information corresponding to the unlicensed carrier(s) may be transmitted on the same PUCCH resource, a requirement on power of the terminal equipment is lower, thereby saving resources.

The independent PUCCH solution may be better compatible with an existing transmission solution for the feedback information corresponding to the licensed carrier(s). A reliability requirement of the licensed carrier(s) is higher than that of the unlicensed carrier(s), so that the solution may preferably ensure that transmission performance of ACK/NACK information corresponding to the licensed carrier(s) is not affected.

In an implementation mode of the first aspect, the operation that the M-bit feedback information is determined may include that the value of M is determined according to the number of PDSCHs received on the unlicensed carrier(s). Or, the value of M is determined according to a maximum carrier index of all unlicensed carrier(s) receiving the PDSCHs. Or, the value of M is determined according to the total number of the unlicensed carrier(s) which are aggregated.

In an implementation mode of the first aspect, the method may be applied to a Time Division Duplex (TDD) system, and the operation that the M-bit feedback information is determined may include that the value of M is determined according to the number of the downlink subframes in the first downlink subframe set.

In an implementation mode of the first aspect, the operation that the N-bit feedback information is determined may include that: a value of N is determined according to the DCI.

In an implementation mode of the first aspect, the operation that the M-bit feedback information is transmitted on the L first PUCCH resource(s) in the K first PUCCH resource(s) may include that bit padding is performed on the M-bit feedback information to obtain an information sequence with a length of Q bits when M is smaller than Q, and the information sequence with the length of Q bits is transmitted on the L first PUCCH resource(s) in the K first PUCCH resource(s), wherein Q may be a positive integer, and Q may be a threshold value predetermined by a protocol or configured by the base station.

Therefore, by the feedback information sequence with the determined length, the base station is not required to perform blind detection on the length of the feedback information sequence during reception, a detection algorithm is simplified, and detection performance is improved. Bit padding over information may ensure consistent understanding on a relationship of the information of respective bits in the feedback information sequence between the base station and the terminal equipment.

A second aspect provides a method for transmitting feedback information, including that a base station transmits a first signaling to terminal equipment, the first signaling being configured to indicate K first PUCCH resource(s), wherein K may be a positive integer. In a first downlink subframe set, the base station transmits data to the terminal equipment on licensed carrier(s) and/or unlicensed carrier(s) which are aggregated. When the base station transmits the data to the terminal equipment on the unlicensed carrier(s), the base station receives M-bit feedback information corresponding to the unlicensed carrier(s) and N-bit feedback information corresponding to the licensed carrier(s) from the terminal equipment on L first PUCCH resource(s) in the K first PUCCH resource(s) in a first uplink subframe, or, when the base station transmits the data to the terminal equipment on the licensed carrier(s) and the unlicensed carrier(s), the base station receives the N-bit feedback information corresponding to the licensed carrier(s) from the terminal equipment on at least one second PUCCH resource and receives the M-bit feedback information corresponding to the unlicensed carrier(s) from the terminal equipment on the L first PUCCH resource(s) in the K first PUCCH resource(s) in the first uplink subframe, wherein L may be a positive integer less than or equal to K, the at least one second PUCCH resource is determined according to DCI configured for scheduling data transmission on the licensed carrier(s), M may be an integer more than or equal to 0, N may be an integer more than or equal to 0, at least one of M and N may not be 0, and the first downlink subframe set may include all downlink subframes corresponding to the first uplink subframe transmitting the feedback information.

In an implementation mode of the second aspect, the method may further include that when the base station transmits the data to the terminal equipment only on the licensed carrier(s), the base station receives the N-bit feedback information corresponding to the licensed carrier(s) on the at least one second PUCCH resource in the first uplink subframe, wherein the at least one second PUCCH resource may be determined according to the DCI configured for scheduling data transmission on the licensed carrier(s).

In an implementation mode of the second aspect, the method may further include that the base station determines a value of M according to the number of PDSCHs transmitted on the unlicensed carrier(s). Or, the base station determines the value of M according to a maximum carrier index of all unlicensed carrier(s) transmitting the PDSCHs. Or, the base station determines the value of M according to the total number of the unlicensed carrier(s) which are aggregated.

In an implementation mode of the second aspect, the method may be applied to a TDD system, and the method may further include that the base station determines the value of M according to the number of the downlink subframes in the first downlink subframe set.

In an implementation mode of the second aspect, the method may further include that the base station indicates a value of N according to the DCI.

In an implementation mode of the second aspect, the operation that the M-bit feedback information corresponding to the unlicensed carrier(s) and the N-bit feedback information corresponding to the licensed carrier(s) are received from the terminal equipment on the L first PUCCH resource(s) in the K first PUCCH resource(s) may include that a sequence formed by concatenating and jointly coding the M-bit feedback information and the N-bit feedback information is received on the L first PUCCH resource(s).

A third aspect provides terminal equipment including a receiving module, a judgment module and a transmission module, configured to execute corresponding implementation modes of the first aspect and the second aspect.

A fourth aspect provides terminal equipment including a processor, a receiver, a transmitter and a memory, configured to execute corresponding implementation modes of the first aspect and the second aspect, wherein each device of the terminal equipment of the fourth aspect may correspond to a corresponding module of terminal equipment of the third aspect.

A fifth aspect provides a base station including a receiving module and a transmission module, configured to execute corresponding implementation modes of the first aspect and the second aspect, wherein the base station may further include a determination module to execute a corresponding implementation mode.

A sixth aspect provides a base station including a processor, a receiver, a transmitter and a memory, configured to execute corresponding implementation modes of the first aspect and the second aspect, wherein each device of the base station of the sixth aspect may correspond to a corresponding module of a base station of the fifth aspect.

In the first aspect to the sixth aspect as well as corresponding implementation modes, L may be equal to 1, and the L first PUCCH resource(s) may be first PUCCH resource(s) corresponding to the unlicensed carrier with the maximum carrier index in the unlicensed carrier(s).

It should be understood that the solution where L is equal to 1 makes it possible to transmit feedback information corresponding to multiple unlicensed carriers on the same PUCCH resource. Thus, the solution has a lower requirement on the power of the terminal equipment, and may save resources.

According to the method for transmitting the feedback information, the terminal equipment and the base station based on the abovementioned technical solutions of the embodiments of the disclosure, the terminal equipment receives the signaling indicative of the PUCCH resource(s) from the base station, receives the data on the licensed carrier(s) and unlicensed carrier(s) which are aggregated, and after generating the feedback information, transmits the feedback information to the base station through the corresponding PUCCH resource(s), so that efficiency of feedback information transmission may be increased.

BRIEF DESCRIPTION OF DRAWINGS

In order to describe the technical solutions of the embodiments of the disclosure more clearly, the drawings required to be used for descriptions about the embodiments or the conventional art will be simply introduced below. Apparently, the drawings described below are only some embodiments of the disclosure. For those skilled in the art, other drawings may further be obtained according to these drawings without creative work.

DETAILED DESCRIPTION

Figure 1:
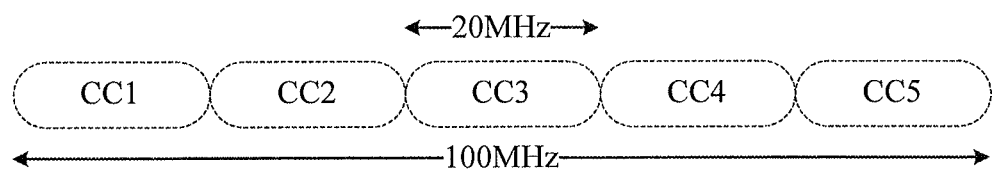
FIG. 1 is a schematic diagram of an LTE CA technology.

The technical solutions in the embodiments of the disclosure will be clearly and completely described below in combination with the drawings in the embodiments of the disclosure. Apparently, the described embodiments are not all embodiments but part of embodiments of the disclosure. All other embodiments obtained by those skilled in the art on the basis of the embodiments in the disclosure without creative work fall within the scope of protection of the disclosure.

Terms "part", "module", "system" and the like used in the specification are adopted to represent an entity, hardware, firmware, combination of hardware and software, software or software in execution related to a computer. For example, a part may be, but not limited to, a process running on a processor, the processor, an object, an executable file, an execution thread, a program and/or a computer. It is graphically represented that all applications running on computing equipment and the computing equipment may be parts. One or more parts may reside in a process and/or an execution thread, and the parts may be located on a computer and/or distributed between two or more computers. In addition, these parts may be executed from various computer-readable media on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

It should be understood that the technical solutions of the embodiments of the disclosure may be applied to various communication systems, for example: a Global System for Mobile Communication (GSM), a Code Division Multiple Access (CDMA) system, a Wideband Code Division Multiple Access (WCDMA) General Packet Radio Service (GPRS) system, an LTE system, an LTE Frequency Division Duplex (FDD) system, LTE TDD, a Universal Mobile Telecommunication System (UMTS), a Worldwide Interoperability for Microwave Access (WiMAX) communication system and a future 5th-Generation (5G) communication system.

Each embodiment is described in the disclosure in combination with terminal equipment. The terminal equipment may communicate with one or more core networks through a Radio Access Network (RAN), and the terminal equipment may refer to User Equipment (UE), an access terminal, a user unit, a subscriber station, a mobile radio station, a mobile station, a remote station, a remote terminal, mobile equipment, a user terminal, a terminal, wireless communication equipment, a user agent or a user device. The access terminal may be a cellular telephone, a cordless telephone, a Session Initiation Protocol (SIP) telephone, a Wireless Local Loop (WLL) station, a Personal Digital Assistant (PDA), handheld equipment with a wireless communication function, computing equipment, or other processing equipment connected to a wireless modem, vehicle-mounted equipment, wearable equipment, terminal equipment in a future 5G network and the like.

Each embodiment is described in the disclosure in combination with a base station. The base station may be equipment configured to communicate with the terminal equipment, and for example, may be a Base Transceiver Station (BTS) in a GSM or CDMA, may also be a NodeB (NB) in a WCDMA system, and may further be an Evolutional Node B (eNB or eNodeB) in an LTE system. Alternatively, the base station may be a relay station, an access point, vehicle-mounted equipment, wearable equipment, network-side equipment in the future 5G network and the like.

Related technologies and concepts involved in the embodiments of the disclosure will be briefly introduced below.

CA Technology

Along with development of a communication technology, an LTE-Advanced (LTE-A) technology is evolved from an LTE technology. In an LTE-A Release 10 (R10) system, a CA technology comes into use for bandwidth extension. That is, at most 5 LTE carriers CC1~CC5 shown in FIG. 1 may be aggregated to achieve a transmission bandwidth of maximally 100 MHz. According to a capability of terminal equipment and an amount of data transmitted thereby, a base station may configure the number of carriers aggregated for transmission for each piece of terminal equipment, and the aggregated carriers may be called as CCs.

For a piece of terminal equipment, multiple aggregated CCs include: (1) a Primary Cell (PCell), wherein there is only one PCell, the terminal equipment executes an initial connection establishment process or a starts a connection reestablishment process on the PCell, the terminal equipment receives a common search space of a PDCCH only on the PCell, and the terminal equipment transmits a PUCCH only on the PCell; and (2) Secondary Cells (SCells), wherein the other CCs except the PCell are all SCells, and the terminal equipment may receive DCI and PDSCHs on the SCells and transmit PUSCHs on the SCells.

Feedback of ACK Information or NACK Information

After establishing a communication connection with a base station, terminal equipment receives DCI and acquires scheduling information (which may include, for example, locations and the number of physical resources, a modulation and coding level and the like) corresponding to a PDSCH. The terminal equipment receives the PDSCH according to the scheduling information, and demodulates and decodes a TB carried therein. If a decoding result is correct, the terminal equipment may feedback ACK information to the base station. If the decoding result is incorrect, the terminal equipment may feedback NACK information to the base station, and then the base station retransmits the TB.

The ACK information or the NACK information may be transmitted through a PUSCH or a PUCCH. When the terminal equipment has no PUSCH transmitted in an uplink subframe, the ACK information or NACK transmitted in the subframe may only be transmitted through the PUCCH.

LAA Technology

At present, a wireless cellular system starts considering extension of a using frequency of the cellular system with an unlicensed frequency band (for example, a frequency band of 2.4 GHz and 5.8 GHz), which mainly include an LAA technology. Main characteristics of the LAA technology include that: (1) the unlicensed frequency band is required to be aggregated with a licensed frequency band, the unlicensed frequency band may only work as an SCell. For better supporting the LAA technology, an LTE-A Release 13 (R13) system may support aggregation of at most 32 CCs; and (2) use of the unlicensed frequency band is not only limited to scheduling of a base station but also limited to a load of the unlicensed frequency band. That is, a competition mechanism is required by use of the unlicensed frequency band.

For a conventional CA system, a scheduler of a base station schedules data of each carrier in a certain subframe in a unified manner, so that the base station may completely know about a scheduling condition on each carrier in the subframe. Therefore, the base station may set some information fields configured to notify the terminal equipment of a total amount of ACK information or NACK information required to be fed back by terminal equipment in the current subframe in the DCI, and efficiency of transmission of the ACK information or the NACK information between the terminal equipment and the base station may be increased.

However, for an unlicensed carrier in an LAA system, the base station completes preparations (coding, modulation, resource mapping and the like) for data in a subframe, but it is uncertain about the specific subframe on which the data is transmitted, that is, the base station may not completely know about a scheduling condition on each carrier in any downlink subframe. Therefore, the base station may not set information in the DCI to indicate the amount of feedback information (ACK information or NACK information) required to be fed back by the terminal equipment, which lowers the efficiency of feedback information transmission between the base station and the terminal equipment.

It should be understood that the feedback information mentioned in the disclosure may include ACK information and/or NACK information.

In each embodiment of the disclosure, in an LAA system, a base station may schedule data of each licensed carrier in a certain subframe in a unified manner, so that the base station may completely know about a scheduling condition on each licensed carrier in the subframe. Therefore, the base station may know about an amount of feedback information, to be transmitted by terminal equipment, corresponding to the licensed carriers in advance. For unlicensed carriers, the terminal equipment may generate a certain amount of feedback information in a manner predetermined with the base station, so that the base station may further know about an amount of feedback information, to be transmitted by the terminal equipment, corresponding to the unlicensed carriers in the predetermined manner. Therefore, the problem of low efficiency of transmission of the feedback information due to the fact that the base station does not know about an amount of ACK information or NACK information transmitted by the terminal equipment is solved. The above is an idea of the disclosure.

In an embodiment of the disclosure, the base station and the terminal equipment may predetermine a manner for determining M-bit feedback information corresponding to the unlicensed carriers according to a protocol or a preset rule, so that the problem that the base station in the LAA system may not know about the amount of the feedback information transmitted by the terminal equipment may be solved. For example, (1) the terminal equipment may determine a value of M according to the number of PDSCHs received on the unlicensed carriers. The base station may also determine the value of M according to the same rule.

Figure 2:
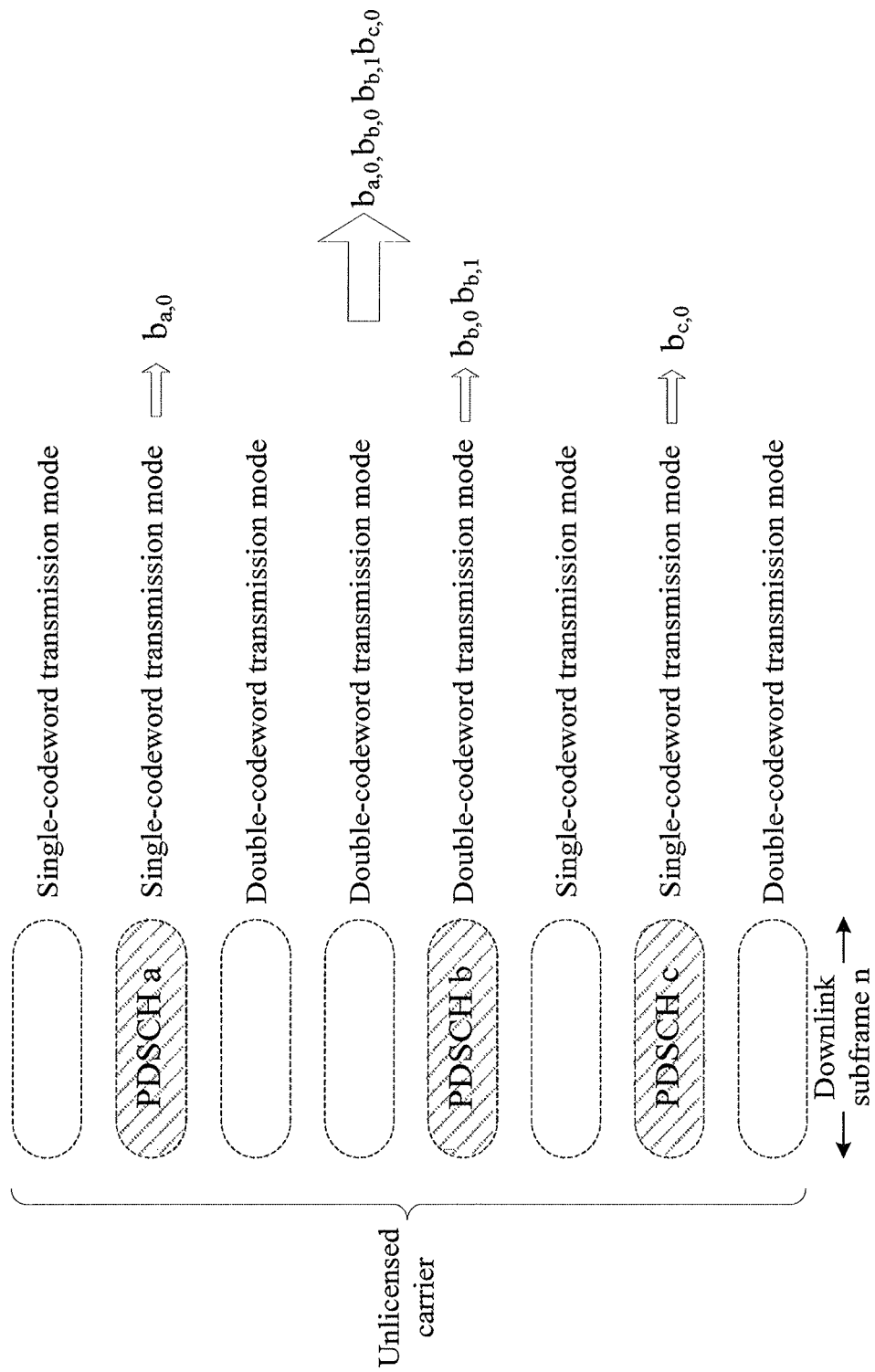
FIG. 2 is a schematic diagram of generation of feedback information according to an embodiment of the disclosure.

Specifically, in an example, the terminal equipment determines a total length of a sequence of the feedback information according to the total number of the PDSCHs received on a downlink subframe n and a transmission mode on each unlicensed carrier. As shown in FIG. 2, when the unlicensed carriers are configured to adopt a single-codeword transmission mode, a PDSCH corresponds to 1-bit feedback information (ACK information or NACK information); and when the unlicensed carriers are configured to adopt a double-codeword transmission mode, a PDSCH corresponds to 2-bit feedback information. The terminal equipment receives PDSCHs a~c on 8 unlicensed carriers used by it, and correspondingly determines a sequence $b_{a,0}$, $b_{b,0}$, $b_{b,1}$, $b_{c,0}$ of the feedback information.

Alternatively, (2) the terminal equipment may determine the value of M according to a maximum carrier index of all unlicensed carriers receiving the PDSCHs. The base station may also determine the value of M according to the same rule.

Figure 3:
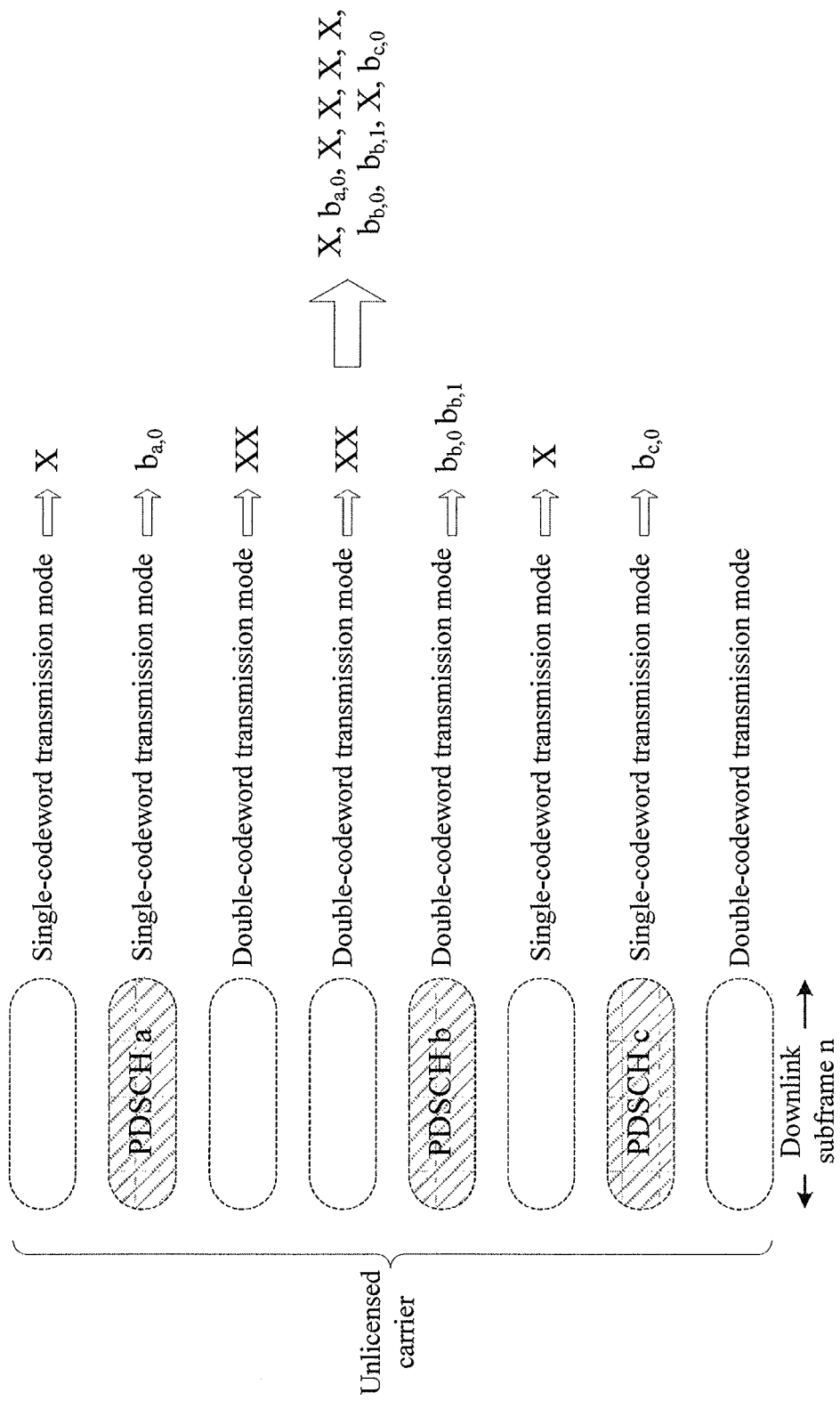
FIG. 3 is a schematic diagram of generation of feedback information according to another embodiment of the disclosure.

Specifically, in an example, the terminal equipment determines the value of the total length M of the sequence of the feedback information according to the unlicensed carrier with the maximum number in all the unlicensed carriers receiving the PDSCHs on the downlink subframe n and the transmission mode on each unlicensed carrier, and generates the M-bit feedback information. As shown in FIG. 3, X represents bit occupation information, and when the unlicensed carriers before the unlicensed carrier with the maximum number in all the unlicensed carriers receiving the PDSCHs receives no PDSCH, no ACK information or NACK information is fed back, and the bit occupation information X is adopted for representation. The terminal equipment receives the PDSCHs a~c on the 8 unlicensed carriers used by it, and correspondingly determines a sequence X, $b_{a,0}$, X, X, X, X, $b_{b,0}$, $b_{b,1}$, X, $b_{c,0}$ of the feedback information. That is, the feedback information is stopped at the unlicensed carrier, receiving the corresponding PDSCH, with the maximum number, and subsequent unlicensed carriers receiving no PDSCHs do not adopt the bit occupation information X for representation. It should be understood that, similar to the previous example, the number of bits in the feedback information corresponding to each unlicensed carrier in this example corresponds to the transmission mode of the unlicensed carrier, which will not be elaborated herein.

Alternatively, (3) the terminal equipment may determine the value of M according to the total number of unlicensed carriers which are aggregated. The base station may also determine the value of M according to the same rule.

Figure 4:
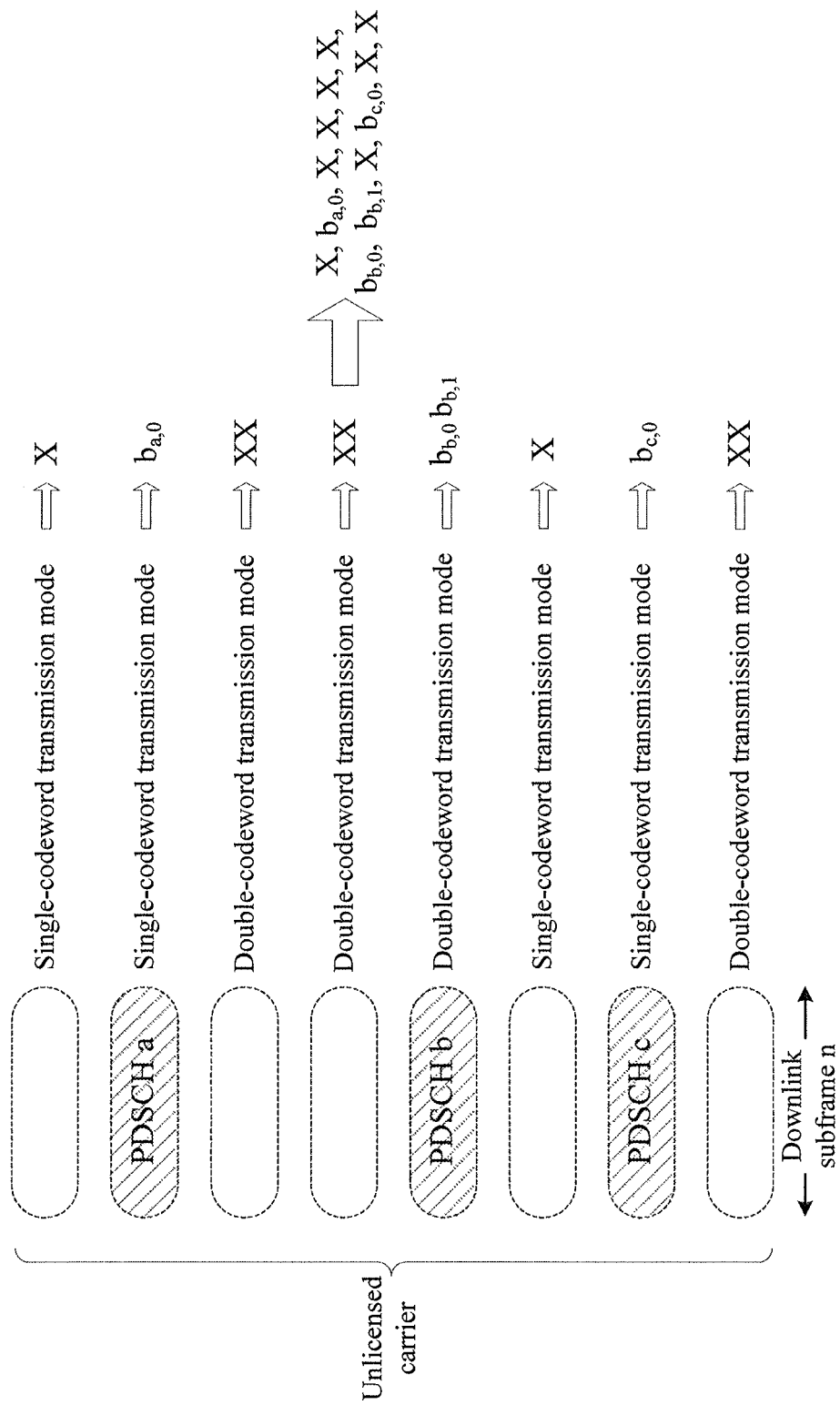
FIG. 4 is a schematic diagram of generation of feedback information according to another embodiment of the disclosure.

Specifically, in an example, the terminal equipment determines the total length of the sequence of the feedback information according to all the unlicensed carriers which are aggregated and the transmission mode on each unlicensed carrier. As shown in FIG. 4, X represents the bit occupation information, when all the unlicensed carriers do not receive any PDSCH, no ACK information or NACK information is fed back, and the bit occupation information X is adopted for representation. The terminal equipment receives the PDSCHs a~c on the 8 unlicensed carriers used by it, and correspondingly determines a sequence X, $b_{a,0}$, X, X, X, X, $b_{b,0}$, $b_{b,1}$, X, $b_{c,0}$, X, X of the feedback information. It should be understood that, similar to the previous two examples, the number of bits in the feedback information corresponding to each unlicensed carrier in this example corresponds to the transmission mode of the unlicensed carrier, which will not be elaborated herein.

In addition, besides the abovementioned methods for determining the number of bits in the feedback information corresponding to the unlicensed carriers, if a system to which the embodiments of the disclosure are applied is a TDD system, since the number of downlink subframes may be unequal to the number of uplink subframes, when the M-bit feedback information corresponding to the unlicensed carriers is determined, the value of M may further be determined according to the number of the downlink subframes in a first downlink subframe set, wherein the first downlink subframe set (for example, a downlink subframe set S) includes all downlink subframes corresponding to the first uplink subframe for transmitting feedback information. That is, the feedback information of all the downlink subframes for transmitting the feedback information by the same uplink subframe (for example, the first uplink subframe) is integrated to generate a sequence of the M-bit feedback information for transmission together.

Specific implementation manners for determination of M by the terminal equipment and the base station by appointment and generation of the M-bit feedback information by the terminal equipment are introduced above in detail. It should be understood that many other methods may also be adopted for determination of M by the terminal equipment and the base station by appointment and generation of the M-bit feedback information by the terminal equipment, and will not be limited in the embodiments of the disclosure.

A flow of interactively transmitting feedback information by the base station and the terminal equipment through a signaling, a message or the like in the embodiments of the disclosure will be introduced below in detail.

At first, configuration of PUCCH resource(s) by the base station is introduced. The base station may configure a PUCCH resource for each unlicensed carrier, and the PUCCH resources corresponding to different unlicensed carriers may be the same, and may also be different.

Figure 5:
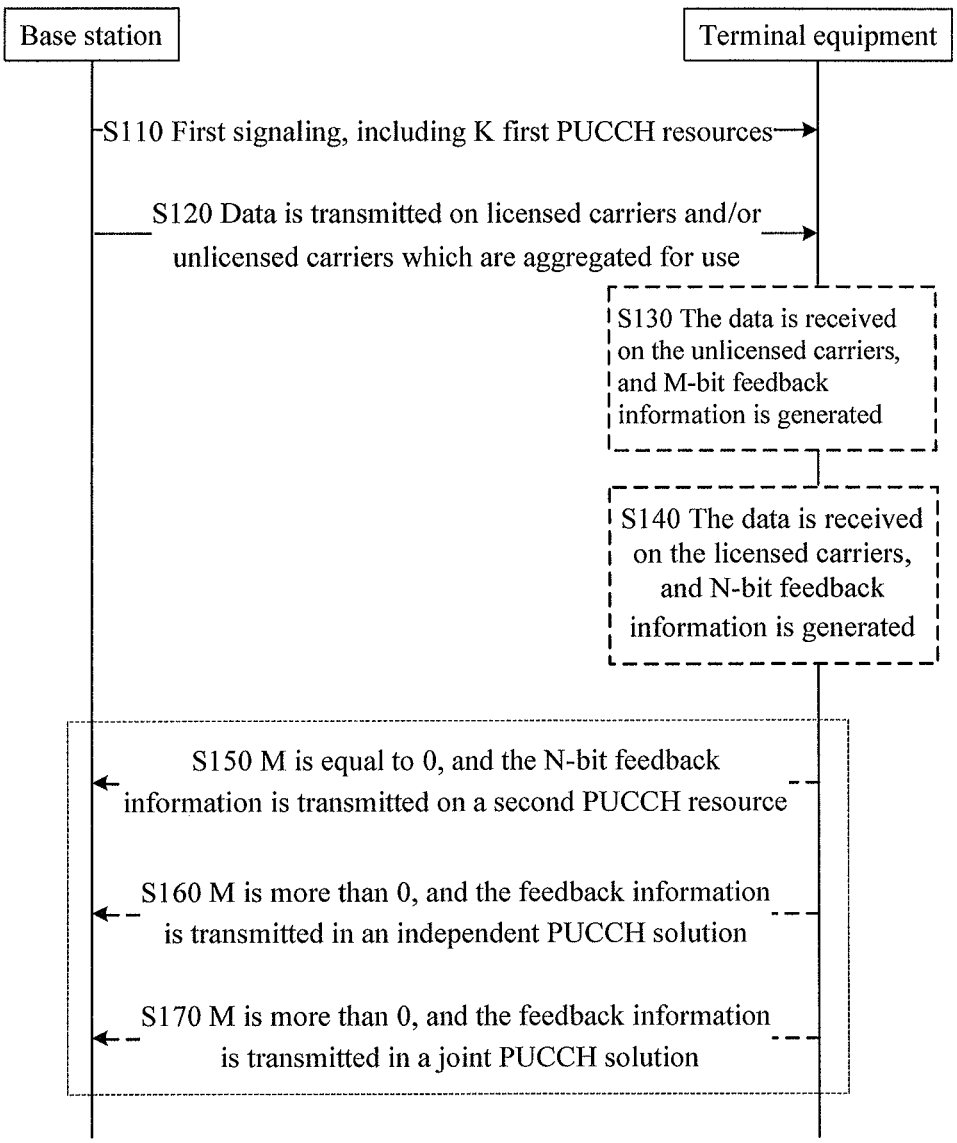
FIG. 5 is a schematic flowchart illustrating a method for transmitting feedback information according to an embodiment of the disclosure.

In a specific example, as shown in FIG. 5, a method 100 for transmitting feedback information includes the following operations.

In S110, a base station sends a first signaling to terminal equipment. Correspondingly, for the terminal equipment, the terminal equipment receives the first signaling sent by the base station. The first signaling is configured to indicate K first PUCCH resource or resources, and the K first PUCCH resource(s) are configured to transmit feedback information of the terminal equipment for data reception on unlicensed carrier(s) in a first downlink subframe in a first uplink subframe, wherein K is a positive integer, the first downlink subframe set includes all downlink subframes corresponding to the first uplink subframe for transmitting the feedback information, and the unlicensed carrier(s) are aggregated with licensed carrier(s).

Specifically, the base station may configure the PUCCH resource(s) in a semi-static manner through high-layer signaling, and may also configure the PUCCH resource(s) in a dynamic manner through downlink control signaling. The base station may configure a PUCCH resource for each unlicensed carrier used by the terminal equipment. The PUCCH resources configured for any two unlicensed carriers may be the same, and may also be different. When the PUCCH resources configured for all the unlicensed carriers are the same, K is equal to 1.

In S120, in a first downlink subframe set S, the base station transmits data to the terminal equipment on licensed carrier (s) and/or unlicensed carrier(s) which are aggregated. Correspondingly, the terminal equipment receives the data on the licensed carriers and/or the unlicensed carriers, wherein the licensed carriers and/or unlicensed carriers which are aggregated refer to that the base station licenses the terminal equipment to simultaneously receive the data on the licensed carriers and the unlicensed carriers. During practical implementation, according to a distribution condition of the data and a condition of the carriers, the base station may transmit the data to the terminal equipment on the licensed carrier(s) and unlicensed carrier(s) which are aggregated, may also transmits the data to the terminal equipment only on the licensed carrier(s), and may further transmit the data to the terminal equipment only on the unlicensed carrier(s), which will not be limited in the embodiments of the disclosure.

In S130, when the base station transmits the data on the unlicensed carrier(s), the terminal equipment receives the data on the unlicensed carrier(s), and determines M-bit feedback information for the data received on the unlicensed carrier(s), wherein M is an integer more than or equal to 0. A method for determining M and a method for generating the M-bit feedback information may refer to the descriptions made above, and will not be elaborated herein.

In S140, when the base station transmits the data on the licensed carrier(s), the terminal equipment receives the data on the licensed carrier(s), and determines N-bit feedback information for the data received on the licensed carrier(s), wherein N is an integer more than or equal to 0.

Specifically, the operation that the N-bit feedback information is determined may include that a value of N is determined according to DCI, wherein the DCI is configured for scheduling data transmission on the licensed carrier(s). That is, the licensed carrier(s) used by the terminal equipment are scheduled by the base station in a manner of transmitting the DCI. Therefore, the base station may foresee a feedback information transmission condition of the terminal equipment according to a licensed carrier using condition of the terminal equipment. The base station may set an information field configured to contain the value of N or contain an algorithm or rule for determining N in the DCI, which will not be limited in the embodiments of the disclosure. The terminal equipment may determine the value of N according to the information field of the DCI.

It should be understood that both S130 and S140 are not necessary in the embodiments of the disclosure, but at least one operation in S130 and S140 may be executed, which is specifically similar to descriptions in S120 and will not be elaborated herein.

For an existing LAA system, the terminal equipment aggregates A (A is more than or equal to 1) licensed carrier(s) and B (B is more than or equal to 1) unlicensed carrier(s). If M is equal to 0, in S150, the terminal equipment may transmit the N-bit feedback information on at least one second PUCCH resource in the first uplink subframe, wherein the at least one second PUCCH resource may be determined according to the DCI configured for scheduling data transmission on the licensed carrier(s). Preferably, the N-bit feedback information may be transmitted on one second PUCCH resource.

When M is more than 0, one of two solutions of S160 and S170 may be selected.

Herein, the solution corresponding to S160 is called as an independent PUCCH solution for short.

Specifically, the licensed carrier(s) adopt an aggregated ACK information or NACK information feedback working mode of LTE R13 carrier(s). When the DCI is set, the base station considers scheduling conditions on the licensed carrier(s) only. The terminal equipment determines the second PUCCH resource transmitting the feedback information according to the DCI, and transmits the feedback information corresponding to the licensed carrier(s) by the second PUCCH resource. Correspondingly, the terminal equipment transmits the N-bit feedback information on the at least one second PUCCH resource in the first uplink subframe, wherein the at least one second PUCCH resource is determined according to the DCI configured for scheduling data transmission on the licensed carrier(s).

If the terminal equipment receives the data on the unlicensed carrier(s), only the feedback information corresponding to the unlicensed carrier(s) is transmitted on the independent first PUCCH resource(s). Since the terminal equipment is required to transmit multiple PUCCHs on multiple PUCCH resources (at least one first PUCCH resource and at least one second PUCCH resource) at the same time, when transmitted power of the terminal equipment is limited, PUCCH transmission corresponding to the licensed carrier(s) is preferably ensured, and PUCCH power corresponding to the unlicensed carrier(s) may even be reduced to be 0, which will not be limited in the embodiments of the disclosure.

It should be understood that the solution corresponding to S160 may be better compatible with an existing transmission solution for the feedback information corresponding to the licensed carrier(s). A reliability requirement of the licensed carrier(s) is higher than that of the unlicensed carrier(s), so that the solution may preferably ensure that transmission performance of the ACK/NACK information corresponding to the licensed carrier(s) is not affected.

The solution corresponding to S170 is called as a joint PUCCH solution for short.

Specifically, the terminal equipment transmits all the feedback information (the N-bit feedback information corresponding to the licensed carrier(s) and the M-bit feedback information corresponding to the unlicensed carrier(s)) on the licensed carrier(s) and the unlicensed carrier(s) by the first PUCCH resource(s) determined according to the unlicensed carrier(s). Correspondingly, the terminal equipment transmits the N-bit feedback information on L first PUCCH resource(s) in the first uplink subframe, wherein L is a positive integer less than or equal to K.

It should be understood that the solution corresponding to S170 may transmit the feedback information corresponding to the licensed carrier(s) and the feedback information corresponding to the unlicensed carrier(s) on the same PUCCH resource, thereby having a lower requirement on the power of the terminal equipment, and saving resources.

In a word, in either the independent PUCCH solution or the joint PUCCH solution, the terminal equipment transmits the M-bit feedback information on the L first PUCCH resource(s) in the K first PUCCH resource(s) in the first uplink subframe, wherein L is a positive integer less than or equal to K.

When M is more than 0, in a preferred solution, L is equal to 1, and the L first PUCCH resource is a first PUCCH resource corresponding to the unlicensed carrier with the maximum carrier index in the unlicensed carrier(s).

Specifically, if the terminal equipment receives downlink data on multiple unlicensed carriers in the downlink subframe set S at the same time and different unlicensed carriers correspond to different first PUCCH resources, the terminal equipment may select a first PUCCH resource as a PUCCH resource actually used for transmission according to a predetermined rule. Preferably, the PUCCH resource corresponding to the unlicensed carrier with the maximum number in all the unlicensed carrier(s) for receiving the downlink data transmission is selected. It should be understood that, in the embodiments of the disclosure, the terminal equipment may further use another predetermined rule, for example, the PUCCH resource corresponding to the unlicensed carrier with a minimum number, which will not be limited in the embodiments of the disclosure.

It should be understood that the solution where L is equal to 1 makes it possible to transmit feedback information corresponding to multiple unlicensed carriers on the same PUCCH resource, thereby having a lower requirement on the power of the terminal equipment, and saving resources.

In addition, the operation that the M-bit feedback information is transmitted on the L first PUCCH resource(s) in the K first PUCCH resource(s) may include that bit padding is performed on the M-bit feedback information to obtain an information sequence with a length of Q bits when M is smaller than Q, and the information sequence with the length of Q bits is transmitted on the L first PUCCH resource(s) in the K first PUCCH resource(s), wherein Q is a positive integer, and Q is a threshold value predetermined by a protocol or configured by the base station.

It should be understood that, by the feedback information sequence with the determined length, the base station is not required to perform blind detection on the length of the feedback information sequence during reception, a detection algorithm is simplified, and detection performance is improved. Bit padding over information may ensure consistent understanding on a relationship of the information of each bit in the feedback information sequence between the base station and the terminal equipment.

In the embodiments of the disclosure, the operation that the M-bit feedback information is transmitted on the L first PUCCH resource(s) in the K first PUCCH resource(s) and the N-bit feedback information is transmitted on the L first PUCCH resource(s) may include that the M-bit feedback information and the N-bit feedback information are concatenated and jointly coded for transmission on the L first PUCCH resource(s).

Specifically, there may be multiple solutions for concatenating the M-bit feedback information corresponding to the unlicensed carrier(s) and the N-bit feedback information corresponding to the licensed carrier(s).

Figure 6:
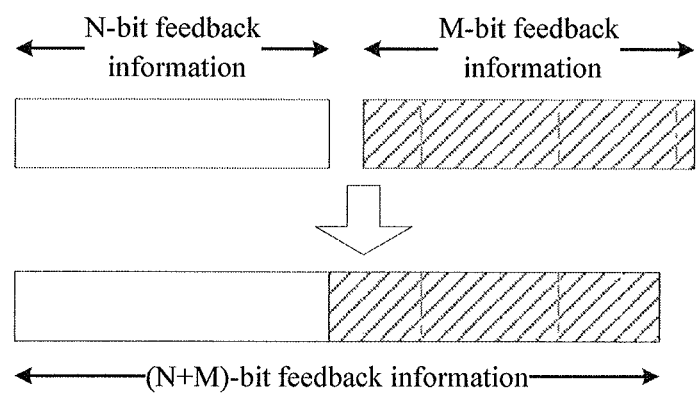
FIG. 6 is a schematic diagram of concatenating of feedback information according to an embodiment of the disclosure.

As an example, as shown in FIG. 6, the N-bit feedback information may be mapped following the M-bit feedback information to obtain concatenated information. It should be understood that, on the contrary, the M-bit feedback information may also be mapped following the N-bit feedback information to obtain concatenated information.

Figure 7:
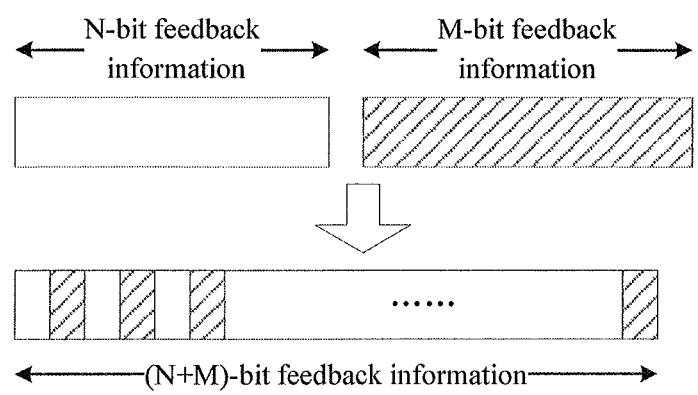
FIG. 7 is a schematic diagram of concatenating of feedback information according to another embodiment of the disclosure.

As another example, as shown in FIG. 7, the N-bit feedback information and the M-bit feedback information may be interleaved-mapped to obtain concatenated information. An interleaving method may refer to an existing interleaving technology, and will not be elaborated in the disclosure.

Figure 8:
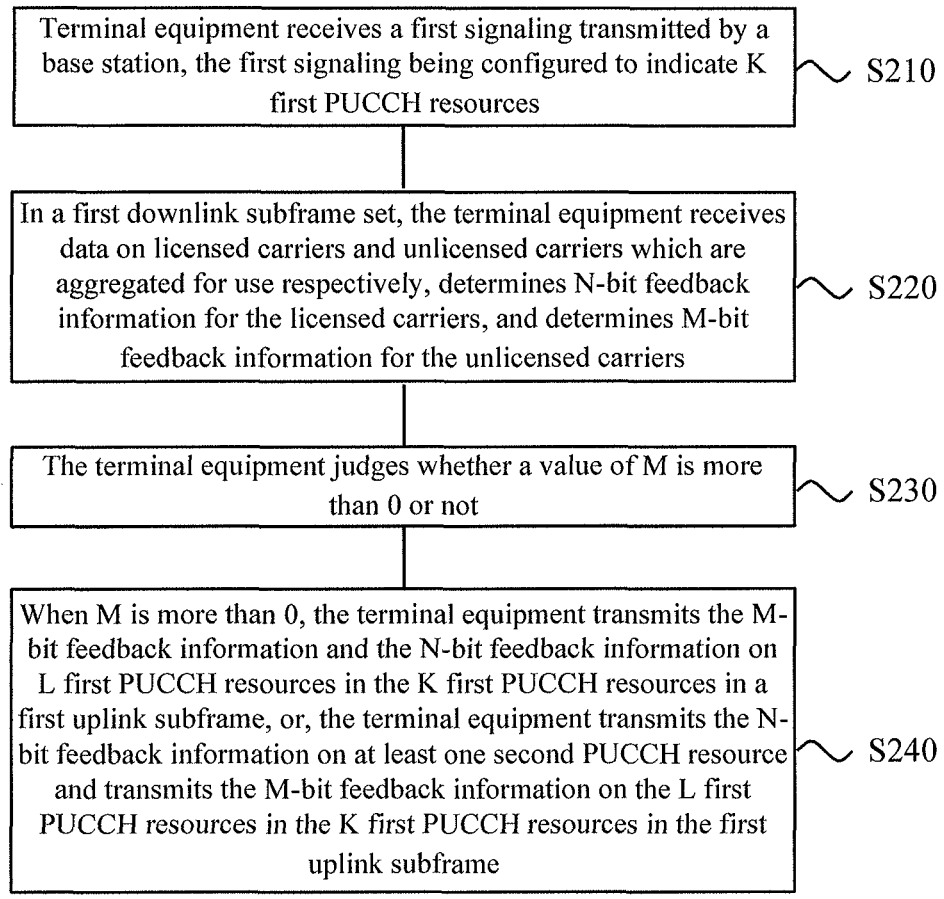
FIG. 8 is a schematic flowchart illustrating a method for transmitting feedback information according to another embodiment of the disclosure.

Corresponding to the method 100, FIG. 8 illustrates a method 200 for transmitting feedback information according to an embodiment of the disclosure in view of terminal equipment. The method 200 includes the following operations.

In S210, the terminal equipment receives a first signaling transmitted by a base station, the first signaling being configured to indicate K first PUCCH resource(s), wherein K is a positive integer.

In S220, in a first downlink subframe set, the terminal equipment respectively receives data on licensed carrier(s) and unlicensed carrier(s) which are aggregated, determines N-bit feedback information for the licensed carrier(s), and determines M-bit feedback information for the unlicensed carrier(s), wherein M is an integer more than or equal to 0, N is an integer more than or equal to 0, and at least one of M and N is not 0.

In S230, the terminal equipment judges whether a value of M is more than 0 or not.

In S240, when M is more than 0, the terminal equipment transmits the M-bit feedback information and the N-bit feedback information on L first PUCCH resource(s) in the K first PUCCH resource(s) in a first uplink subframe, or, the terminal equipment transmits the N-bit feedback information on at least one second PUCCH resource and transmits the M-bit feedback information on the L first PUCCH resource(s) in the K first PUCCH resource(s) in the first uplink subframe, wherein L is a positive integer less than or equal to K, and the at least one second PUCCH resource is determined according to DCI configured for scheduling data transmission on the licensed carrier(s).

Herein, the first downlink subframe set includes all downlink subframes corresponding to the first uplink subframe for transmitting the feedback information.

It should be understood that the first one in S240 in the embodiment of the disclosure corresponds to the joint PUCCH solution of the method 100, and the second one corresponds to the independent PUCCH solution of the method 100.

Herein, preferably, L is equal to 1, and the L first PUCCH resource is the first PUCCH resource corresponding to the unlicensed carrier with a maximum carrier index in the unlicensed carrier(s).

Herein, the operation that the M-bit feedback information is determined may include that the value of M is determined according to the number of PDSCHs received on the unlicensed carrier(s); or, the value of M is determined according to the maximum carrier index of all unlicensed carrier(s) receiving the PDSCHs; or, the value of M is determined according to the total number of the unlicensed carrier(s) which are aggregated.

Herein, when the method 200 is applied to a TDD system, the operation that the M-bit feedback information is determined may include that the value of M is determined according to the number of the downlink subframes in the first downlink subframe set.

Herein, the operation that the M-bit feedback information is transmitted on the L first PUCCH resource(s) in the K first PUCCH resource(s) may include that bit padding is performed on the M-bit feedback information to obtain an information sequence with a length of Q bits when M is smaller than Q, and the information sequence with the length of Q bits is transmitted on the L first PUCCH resource(s) in the K first PUCCH resource(s), wherein Q is a positive integer, and Q is a threshold value predetermined by a protocol or configured by the base station.

Optionally, as an embodiment, the method 200 may further include that when M is equal to 0, the terminal equipment transmits the N-bit feedback information on the at least one second PUCCH resource in the first uplink subframe, wherein the at least one second PUCCH resource is determined according to the DCI configured for scheduling data transmission on the licensed carrier(s).

In the embodiment of the disclosure, the operation that the N-bit feedback information is determined may include that a value of N is determined according to the DCI.

In the embodiment of the disclosure, the operation that the M-bit feedback information and the N-bit feedback information are transmitted on the L first PUCCH resource(s) in the K first PUCCH resource(s) may include that the M-bit feedback information and the N-bit feedback information are concatenated and jointly coded for transmission on the L first PUCCH resource(s).

According to the method for transmitting the feedback information in the embodiment of the disclosure, the terminal equipment receives the signaling configured to indicate the PUCCH resource(s) from the base station, receives the data on the licensed carrier(s) and unlicensed carrier(s) which are aggregated, and after generating the feedback information, transmits the feedback information to the base station through the corresponding PUCCH resource(s), so that efficiency of feedback information transmission may be increased.

It should be understood that the first solution in S240 in the embodiment of the disclosure corresponds to the joint PUCCH solution of the method 100, and the second solution corresponds to the independent PUCCH solution of the method 100.

Figure 9:
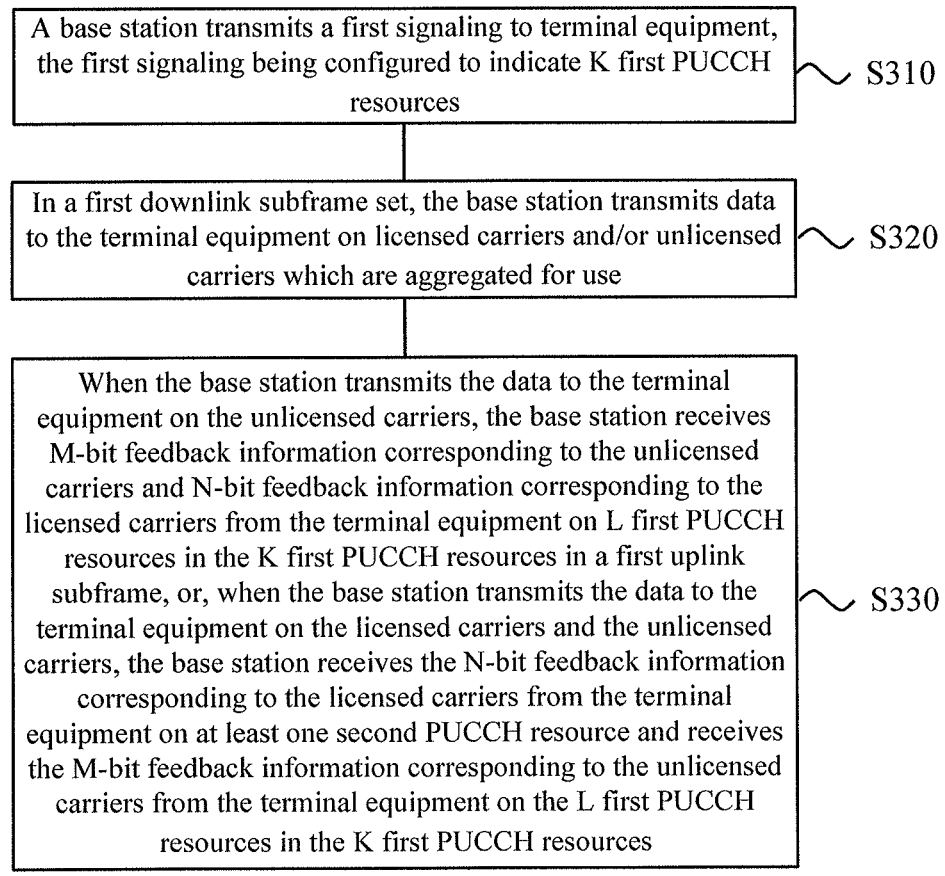
FIG. 9 is a schematic flowchart illustrating a method for transmitting feedback information according to another embodiment of the disclosure.

Corresponding to the method 100, FIG. 9 illustrates a method 300 for transmitting feedback information according to an embodiment of the disclosure in view of a base station. The method 300 includes the following operations.

In S310, the base station transmits a first signaling to terminal equipment, the first signaling being configured to indicate K first PUCCH resource(s), wherein K is a positive integer.

In S320, in a first downlink subframe set, the base station transmits data to the terminal equipment on licensed carrier(s) and/or unlicensed carrier(s) which are aggregated.

In S330, when the base station transmits the data to the terminal equipment on the unlicensed carrier(s), the base station receives M-bit feedback information corresponding to the unlicensed carrier(s) and N-bit feedback information corresponding to the licensed carrier(s) from the terminal equipment on L first PUCCH resource(s) in the K first PUCCH resource(s) in a first uplink subframe, or, when the base station transmits the data to the terminal equipment on the licensed carrier(s) and the unlicensed carrier(s), the base station receives the N-bit feedback information corresponding to the licensed carrier(s) from the terminal equipment on at least one second PUCCH resource and receives the M-bit feedback information corresponding to the unlicensed carrier(s) from the terminal equipment on the L first PUCCH resource(s) in the K first PUCCH resource(s) in the first uplink subframe, wherein L is a positive integer less than or equal to K, the at least one second PUCCH resource is determined according to DCI configured for scheduling data transmission on the licensed carrier(s), M is an integer more than or equal to 0, N is an integer more than or equal to 0, at least one of M and N is not 0, and the first downlink subframe set includes all downlink subframes corresponding to the first uplink subframe for transmitting the feedback information.

It should be understood that the first solution in S330 in the embodiment of the disclosure corresponds to the joint PUCCH solution of the method 100, and the second solution corresponds to the independent PUCCH solution of the method 100.

Herein, preferably, L is equal to 1, and the L first PUCCH resource is the first PUCCH resource corresponding to the unlicensed carrier with a maximum carrier index in the unlicensed carrier(s).

Optionally, as an embodiment, the method 300 may further include that when the base station transmits the data to the terminal equipment only on the licensed carrier(s), the base station receives the N-bit feedback information corresponding to the licensed carrier(s) on the at least one second PUCCH resource in the first uplink subframe, wherein the at least one second PUCCH resource is determined according to the DCI configured for scheduling data transmission on the licensed carrier(s).

In the embodiment of the disclosure, the operation that the M-bit feedback information corresponding to the unlicensed carrier(s) and the N-bit feedback information corresponding to the licensed carrier(s) are received from the terminal equipment on the L first PUCCH resource(s) in the K first PUCCH resource(s) may include that a sequence formed by concatenating and jointly coding the M-bit feedback information and the N-bit feedback information is received on the L first PUCCH resource(s).

In the embodiment of the disclosure, the method 300 may further include that the base station determines a value of M according to the number of PDSCHs transmitted on the unlicensed carrier(s); or, the base station determines the value of M according to the maximum carrier index of all unlicensed carrier(s) transmitting the PDSCHs; or, the base station determines the value of M according to the total number of the unlicensed carrier(s) which are aggregated.

In the embodiment of the disclosure, when the method 300 is applied to a TDD system, the method 300 may further include that the base station determines the value of M according to the number of the downlink subframes in the first downlink subframe set.

In the embodiment of the disclosure, the method 300 may further include that the base station indicates a value of N according to the DCI.

The base station determines the value of M and the value of N, and this is favorable for the base station to receive the feedback information transmitted by the terminal equipment more efficiently according to the value of M and the value of N.

According to the method for transmitting the feedback information in the embodiment of the disclosure, the base station transmits the signaling indicating the PUCCH resource(s) to the terminal equipment, and transmits the data to the terminal equipment on the licensed carrier(s) and unlicensed carrier(s) which are aggregated, and after generating the feedback information, the terminal equipment transmits the feedback information to the base station through the corresponding PUCCH resource(s), so that efficiency of feedback information transmission may be increased.

It should be understood that, in each embodiment of the disclosure, reference numbers in each process do not mean an execution order, the execution order of each process should be determined according to its function and an internal logic, and an implementation process of the embodiment of the disclosure should not be limited.

The methods for transmitting the feedback information in the embodiments of the disclosure are described above in detail, and the terminal equipment and base station for transmitting the feedback information in the embodiments of the disclosure will be described below.

Figure 10:
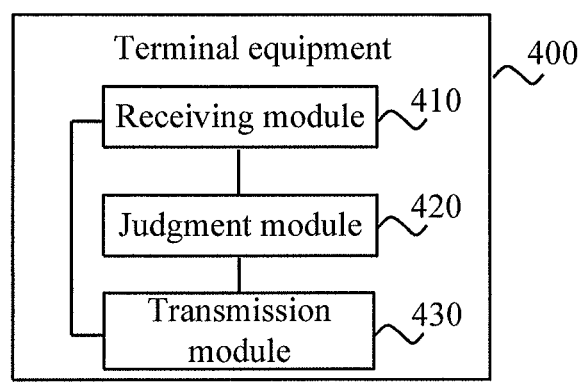
FIG. 10 is a schematic block diagram of terminal equipment according to an embodiment of the disclosure.

FIG. 10 is a schematic block diagram of terminal equipment 400 according to an embodiment of the disclosure. The terminal equipment 400 includes the following modules.

A receiving module 410 is configured to receive a first signaling transmitted by a base station, the first signaling being configured to indicate K first PUCCH resource(s), wherein K is a positive integer.

The receiving module 410 is further configured to, in a first downlink subframe set, receive data on licensed carrier(s) and unlicensed carrier(s) which are aggregated respectively, determine N-bit feedback information for the licensed carrier(s), and determine M-bit feedback information for the unlicensed carrier(s), wherein M is an integer more than or equal to 0, N is an integer more than or equal to 0, and at least one of M and N is not 0.

A judgment module 420 is configured to judge whether a value of M is more than 0 or not.

A transmission module 430 is configured to, when M is more than 0, transmit the M-bit feedback information and the N-bit feedback information on L first PUCCH resource(s) in the K first PUCCH resource(s) in a first uplink subframe, or, transmit the N-bit feedback information on at least one second PUCCH resource and transmit the M-bit feedback information on the L first PUCCH resource(s) in the K first PUCCH resource(s) in the first uplink subframe, wherein L is a positive integer less than or equal to K, and the at least one second PUCCH resource is determined according to DCI configured for scheduling data transmission on the licensed carrier(s).

Herein, the first downlink subframe set includes all downlink subframes corresponding to the first uplink subframe for transmitting the feedback information.

The terminal equipment of the embodiment of the disclosure receives the signaling configured to indicate the PUCCH resource(s) from the base station, receives the data on the licensed carrier(s) and unlicensed carrier(s) which are aggregated, and after generating the feedback information, transmits the feedback information to the base station through the corresponding PUCCH resource(s), so that efficiency of feedback information transmission may be increased.

Optionally, as an embodiment, the transmission module 430 may further be configured to, when M is equal to 0, transmit the N-bit feedback information on the at least one second PUCCH resource in the first uplink subframe, wherein the at least one second PUCCH resource is determined according to the DCI configured for scheduling data transmission on the licensed carrier(s).

Optionally, as an embodiment, the operation that the receiving module 410 determines the M-bit feedback information may include that the receiving module 410 determines the value of M according to the number of PDSCHs received on the unlicensed carrier(s); or, the receiving module 410 determines the value of M according to the maximum carrier index of all unlicensed carrier(s) receiving the PDSCHs; or, the receiving module 410 determines the value of M according to the total number of the unlicensed carrier(s) which are aggregated.

Optionally, as an embodiment, when the terminal equipment 400 is applied to a TDD system, the operation that the receiving module 410 determines the M-bit feedback information includes that the receiving module determines the value of M according to the number of the downlink subframes in the first downlink subframe set.

Optionally, as an embodiment, the operation that the receiving module 410 determines the N-bit feedback information includes that the receiving module determines a value of N according to the DCI.

Optionally, in the embodiment of the disclosure, the operation that the transmission module 430 transmits the M-bit feedback information and the N-bit feedback information on the L first PUCCH resource(s) in the K first PUCCH resource(s) may include that the transmission module 430 concatenates and jointly codes the M-bit feedback information and the N-bit feedback information for transmission on the L first PUCCH resource(s).

Preferably, in the embodiment of the disclosure, L may be equal to 1, and the L first PUCCH resource is a first PUCCH resource corresponding to the unlicensed carrier with a maximum carrier index in the unlicensed carrier(s).

Optionally, in the embodiment of the disclosure, the operation that the transmission module 430 transmits the M-bit feedback information on the L first PUCCH resource(s) in the K first PUCCH resource(s) may include that the transmission module performs bit padding on the M-bit feedback information to obtain an information sequence with a length of Q bits when M is smaller than Q, and transmits the information sequence with the length of Q bits on the L first PUCCH resource(s) in the K first PUCCH resource(s), wherein Q is a positive integer, and Q is a threshold value predetermined by a protocol or configured by the base station.

Figure 11:
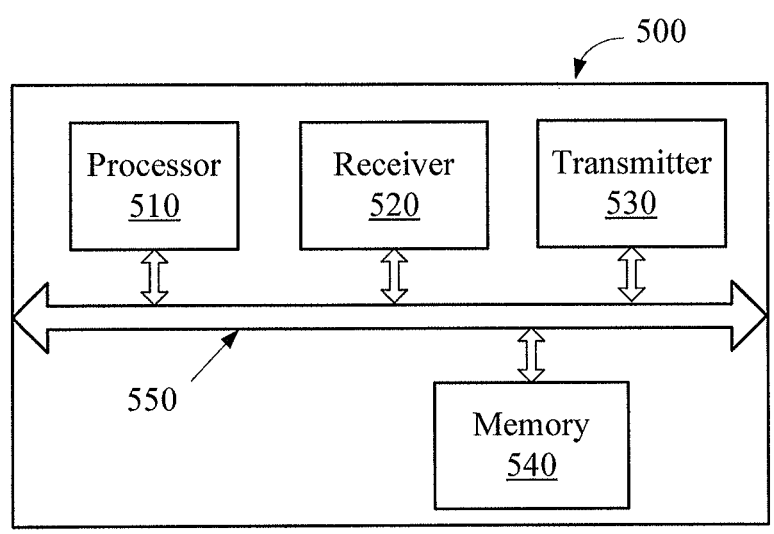
FIG. 11 is a schematic block diagram of terminal equipment according to another embodiment of the disclosure.

It is noted that, in the embodiment of the disclosure, the receiving module 410 may be implemented by a receiver, the transmission module 430 may be implemented by a transmitter, and a judgment module 420 may be implemented by a processor. As shown in FIG. 11, terminal equipment 500 may include a processor 510, a receiver 520, a transmitter 530 and a memory 540, wherein the memory 540 may be configured to store codes executed by the processor 510 and the like.

Respective components in the terminal equipment 500 are coupled together through a bus system 550, wherein the bus system 550 includes a data bus, and further includes a power bus, a control bus and a state signal bus.

The terminal equipment 400 shown in FIG. 10 or the terminal equipment 500 shown in FIG. 11 may implement each process implemented in the embodiments shown in FIG. 1 to FIG. 9, which will not be elaborated herein to avoid repetition.

It is noted that the method embodiments of the disclosure may be applied to a processor or implemented by the processor. The processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiments of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is noted that the memory of a system and method described in the disclosure is intended to include, but not limited to, memories of these and any other proper types.

Figure 12:
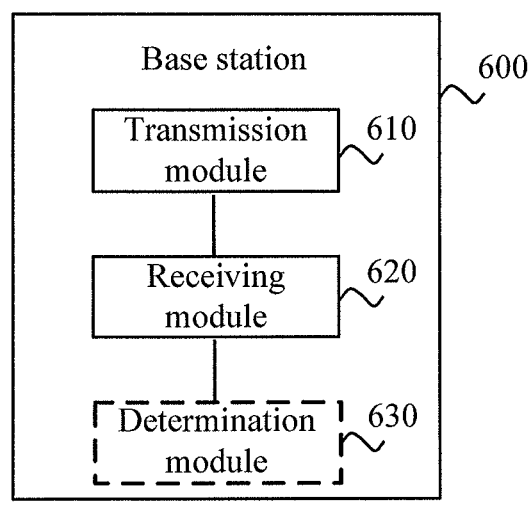
FIG. 12 is a schematic block diagram of a base station according to an embodiment of the disclosure.

FIG. 12 is a schematic block diagram of a base station 600 according to an embodiment of the disclosure. The base station 600 includes the following modules.

A transmission module 610 is configured to transmit a first signaling to terminal equipment, the first signaling being configured to indicate K first PUCCH resource(s), wherein K is a positive integer.

The transmission module 610 is further configured to, in a first downlink subframe set, transmit data to the terminal equipment on licensed carrier(s) and/or unlicensed carrier(s) which are aggregated.

A receiving module 620 is configured to, when the base station transmits the data to the terminal equipment on the unlicensed carrier(s), receive M-bit feedback information corresponding to the unlicensed carrier(s) and N-bit feedback information corresponding to the licensed carrier(s) from the terminal equipment on L first PUCCH resource(s) in the K first PUCCH resource(s) in a first uplink subframe, or, when the base station transmits the data to the terminal equipment on the licensed carrier(s) and the unlicensed carrier(s), receive the N-bit feedback information corresponding to the licensed carrier(s) from the terminal equipment on at least one second PUCCH resource and receive the M-bit feedback information corresponding to the unlicensed carrier(s) from the terminal equipment on the L first PUCCH resource(s) in the K first PUCCH resource(s) in the first uplink subframe, wherein L is a positive integer less than or equal to K, the at least one second PUCCH resource is determined according to DCI configured for scheduling data transmission on the licensed carrier(s), M is an integer more than or equal to 0, N is an integer more than or equal to 0, at least one of M and N is not 0, and the first downlink subframe set includes all downlink subframes corresponding to the first uplink subframe for transmitting the feedback information.

The base station of the embodiment of the disclosure transmits the signaling indicating the PUCCH resource(s) to the terminal equipment, and transmits the data to the terminal equipment on the licensed carrier(s) and unlicensed carrier(s) which are aggregated, and after generating the feedback information, the terminal equipment transmits the feedback information to the base station through the corresponding PUCCH resource(s), so that efficiency of feedback information transmission may be increased.

Optionally, as an embodiment, the receiving module 620 is further configured to, when the base station transmits the data to the terminal equipment only on the licensed carrier(s), receive, by the base station, the N-bit feedback information corresponding to the licensed carrier(s) on the at least one second PUCCH resource in the first uplink subframe, wherein the at least one second PUCCH resource is determined according to the DCI configured for scheduling data transmission on the licensed carrier(s).

Optionally, as an example, the base station 600 further includes a determination module 630, configured to determine a value of M according to the number of PDSCHs transmitted on the unlicensed carrier(s); or, determine the value of M according to the maximum carrier index of all unlicensed carrier(s) transmitting the PDSCHs; or, determine the value of M according to the total number of the unlicensed carrier(s) which are aggregated.

Optionally, as an embodiment, when the base station 600 is applied to a TDD system, the base station 600 further includes the determination module 630, configured to determine the value of M according to the number of the downlink subframes in the first downlink subframe set.

Optionally, as an embodiment, the transmission module 610 is further configured to indicate a value of N through the DCI.

Optionally, in the embodiment of the disclosure, the operation that the receiving module 620 receives the M-bit feedback information corresponding to the unlicensed carrier(s) and the N-bit feedback information corresponding to the licensed carrier(s) from the terminal equipment on the L first PUCCH resource(s) in the K first PUCCH resource(s) includes that the receiving module 620 receives a sequence formed by concatenating and jointly coding the M-bit feedback information and the N-bit feedback information on the L first PUCCH resource(s).

Preferably, in the embodiment of the disclosure, L is equal to 1, and the L first PUCCH resource is a first PUCCH resource corresponding to the unlicensed carrier with the maximum carrier index in the unlicensed carrier(s).

Figure 13:
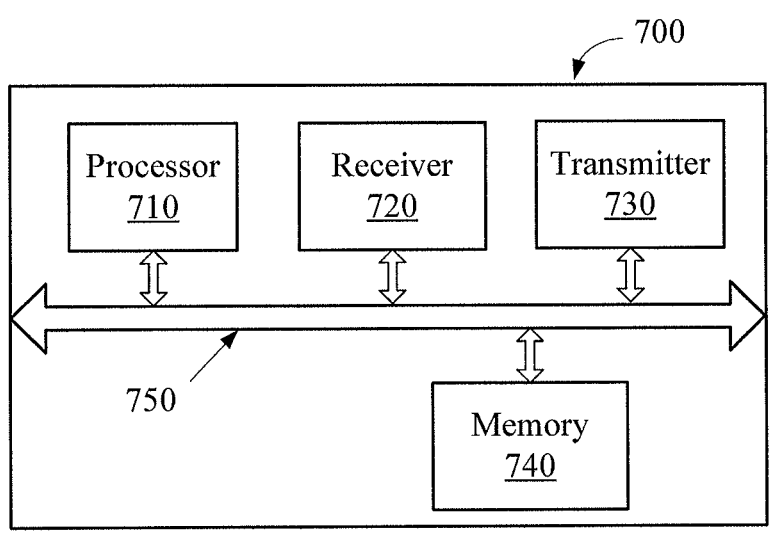
FIG. 13 is a schematic block diagram of a base station according to another embodiment of the disclosure.

It is noted that, in the embodiment of the disclosure, the receiving module 620 may be implemented by a receiver, the transmission module 610 may be implemented by a transmitter, and a determination module 630 may be implemented by a processor. As shown in FIG. 13, a base station 700 may include a processor 710, a receiver 720, a transmitter 730 and a memory 740, wherein the memory 740 may be configured to store codes executed by the processor 710 and the like.

Respective components in the base station 700 are coupled together through a bus system 750, wherein the bus system 750 includes a data bus, and further includes a power bus, a control bus and a state signal bus.

The base station 600 shown in FIG. 12 or the base station 700 shown in FIG. 13 may implement each process implemented in the embodiments shown in FIG. 1 to FIG. 9, which will not be elaborated herein to avoid repetition.

Those skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by different methods, but such realization shall fall within the scope of the disclosure.

Those skilled in the art may clearly learn about that the specific working processes of the system, device and unit described above may refer to the corresponding processes in the method embodiments for convenient and brief description and will not be elaborated herein.

In some embodiments provided by the disclosure, it should be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a computer device (which may be a personal computer, a server, network equipment or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting feedback information, comprising:
   receiving, by terminal equipment, a first signaling transmitted by a base station, the first signaling being configured to indicate K first Physical Uplink Control Channel (PUCCH) resource(s), wherein K is a positive integer;
   in a first downlink subframe set, respectively receiving, by the terminal equipment, data on licensed carrier(s) and unlicensed carrier(s) which are aggregated, determining N-bit feedback information for the licensed carrier(s), and determining M-bit feedback information for the unlicensed carrier(s), wherein M is an integer more than or equal to 0, N is an integer more than or equal to 0, and at least one of M and N is not 0;
   judging, by the terminal equipment, whether M is more than 0 or not; and
   when M is more than 0, transmitting, by the terminal equipment, the M-bit feedback information and the N-bit feedback information on L first PUCCH resource(s) in the K first PUCCH resource(s) in a first uplink subframe, or, transmitting, by the terminal equipment, the N-bit feedback information on at least one second PUCCH resource and transmitting the M-bit feedback information on L first PUCCH resource(s) in the K first PUCCH resource(s) in a first uplink subframe, wherein L is a positive integer less than or equal to K, and the at least one second PUCCH resource is determined according to Downlink Control Information (DCI) configured for scheduling data transmission on the licensed carrier(s),
   wherein the first downlink subframe set comprises all downlink subframes corresponding to the first uplink subframe for transmitting the feedback information.

2. The method according to claim 1, further comprising:
   when M is equal to 0, transmitting, by the terminal equipment, the N-bit feedback information on the at least one second PUCCH resource in the first uplink subframe, wherein the at least one second PUCCH resource is determined according to the DCI configured for scheduling data transmission on the licensed carrier(s).

3. The method according to claim 1, wherein determining the M-bit feedback information comprises:
   determining M according to the number of Physical Downlink Share Channel(s) (PDSCH(s)) received on the unlicensed carrier(s); or,
   determining M according to a maximum carrier index of all unlicensed carrier(s) receiving the PDSCH(s); or,
   determining M according to the total number of the unlicensed carrier(s) in aggregation.

4. The method according to claim 1, applied to a Time Division Duplex (TDD) system, wherein determining the M-bit feedback information comprises:
   determining M according to the number of the downlink subframes in the first downlink subframe set.

5. The method according to claim 1, wherein determining the N-bit feedback information comprises:
   determining N according to the DCI.

6. The method according to claim 1, wherein transmitting the M-bit feedback information and the N-bit feedback information on the L first PUCCH resource(s) in the K first PUCCH resource(s) comprises:
   concatenating and jointly coding the M-bit feedback information and the N-bit feedback information for transmission on the L first PUCCH resource(s).

7. The method according to claim 1, wherein L is equal to 1 and the L first PUCCH resource is a first PUCCH resource corresponding to the unlicensed carrier with the maximum carrier index in the unlicensed carrier(s).

8. The method according to claim 1, wherein transmitting the M-bit feedback information on the L first PUCCH resource(s) in the K first PUCCH resource(s) comprises:
   performing bit padding on the M-bit feedback information to obtain an information sequence with a length of Q bits when M is smaller than Q, and transmitting the information sequence with the length of Q bits on the L first PUCCH resource(s) in the K first PUCCH resource(s), wherein Q is a positive integer, and Q is a threshold value predetermined by a protocol or configured by the base station.

9. A method for transmitting feedback information, comprising:
   transmitting, by a base station, a first signaling to terminal equipment, the first signaling being configured to indicate K first Physical Uplink Control Channel (PUCCH) resource(s), wherein K is a positive integer;
   in a first downlink subframe set, transmitting, by the base station, data to the terminal equipment on licensed carrier(s) and/or unlicensed carrier(s) which are aggregated; and
   when the base station transmits the data to the terminal equipment on the unlicensed carrier(s), receiving, by the base station, M-bit feedback information corresponding to the unlicensed carrier(s) and N-bit feedback information corresponding to the licensed carrier(s) from the terminal equipment on L first PUCCH resource(s) in the K first PUCCH resource(s) in a first uplink subframe, or, when the base station transmits the data to the terminal equipment on the licensed carrier(s) and the unlicensed carrier(s), by the base station, receiving N-bit feedback information corresponding to the licensed carrier(s) from the terminal equipment on at least one second PUCCH resource and receiving M-bit feedback information corresponding to the unlicensed carrier(s) from the terminal equipment on L first PUCCH resource(s) in the K first PUCCH resource(s) in a first uplink subframe, wherein L is a positive integer less than or equal to K, the at least one second PUCCH resource is determined according to Downlink Control Information (DCI) configured for scheduling data transmission on the licensed carrier(s), M is an integer more than or equal to 0, N is an integer more than or equal to 0, at least one of M and N is not 0, and the first downlink subframe set comprises all downlink subframes corresponding to the first uplink subframe for transmitting the feedback information.

10. The method according to claim 9, further comprising:
    when the base station transmits the data to the terminal equipment only on the licensed carrier(s), receiving, by the base station, the N-bit feedback information corresponding to the licensed carrier(s) on the at least one second PUCCH resource in the first uplink subframe, wherein the at least one second PUCCH resource is determined according to the DCI configured for scheduling data transmission on the licensed carrier(s).

11. The method according to claim 9, further comprising:
    determining, by the base station, M according to the number of Physical Downlink Share Channel(s) (PDSCH(s)) transmitted on the unlicensed carrier(s); or,
    determining, by the base station, M according to a maximum carrier index of all unlicensed carrier(s) transmitting the PDSCH(s); or,
    determining, by the base station, M according to the total number of the unlicensed carrier(s) in aggregation.

12. The method according to claim 9, applied to a Time Division Duplex (TDD) system and further comprising:
    determining, by the base station, M according to the number of the downlink subframes in the first downlink subframe set.

13. Terminal equipment, comprising:
    a receiver, configured to receive a first signaling transmitted by a base station, the first signaling being configured to indicate K first Physical Uplink Control Channel (PUCCH) resource(s), wherein K is a positive integer;
    the receiver being further configured to, in a first downlink subframe set, respectively receive data on licensed carrier(s) and unlicensed carrier(s) which are aggregated, determine N-bit feedback information for the licensed carrier(s), and determine M-bit feedback information for the unlicensed carrier(s), wherein M is an integer more than or equal to 0, N is an integer more than or equal to 0, and at least one of M and N is not 0;
    a processor, configured to judge whether M is more than 0 or not; and
    a transmitter, configured to, when M is more than 0, transmit the M-bit feedback information and the N-bit feedback information on L first PUCCH resource(s) in the K first PUCCH resource(s) in a first uplink subframe, or, transmit the N-bit feedback information on at least one second PUCCH resource and transmit the M-bit feedback information on L first PUCCH resource(s) in the K first PUCCH resource(s) in a first uplink subframe, wherein L is a positive integer less than or equal to K, and the at least one second PUCCH resource is determined according to Downlink Control Information (DCI) configured for scheduling data transmission on the licensed carrier(s),
    wherein the first downlink subframe set comprises all downlink subframes corresponding to the first uplink subframe for transmitting the feedback information.

14. The terminal equipment according to claim 13, wherein the transmitter is further configured to:
    when M is equal to 0, transmit, by the terminal equipment, the N-bit feedback information on the at least one second PUCCH resource in the first uplink subframe, wherein the at least one second PUCCH resource is determined according to the DCI configured for scheduling data transmission on the licensed carrier(s).

15. The terminal equipment according to claim 13, wherein the operation that the receiver determines the M-bit feedback information comprises that:
    the receiver determines M according to the number of Physical Downlink Share Channel(s) (PDSCH(s)) received on the unlicensed carrier(s); or,
    the receiver determines M according to a maximum carrier index of all unlicensed carrier(s) receiving the PDSCH(s); or,
    the receiver determines M according to the total number of the unlicensed carrier(s) in aggregation.

16. The terminal equipment according to claim 13, applied to a Time Division Duplex (TDD) system, wherein the operation that the receiver determines the M-bit feedback information comprises that:
    the receiver determines M according to the number of the downlink subframes in the first downlink subframe set.

17. The terminal equipment according to claim 13, wherein determining the N-bit feedback information comprises:
    the receiver determines N according to the DCI.

18. The terminal equipment according to claim 13, wherein the operation that the transmitter transmits the M-bit feedback information and the N-bit feedback information on the L first PUCCH resource(s) in the K first PUCCH resource(s) comprises that:
    the transmitter concatenates and jointly codes the M-bit feedback information and the N-bit feedback information for transmission on the L first PUCCH resource(s).

19. The terminal equipment according to claim 13, wherein L is equal to 1 and the L first PUCCH resource is a first PUCCH resource corresponding to the unlicensed carrier with the maximum carrier index in the unlicensed carrier(s).

20. The terminal equipment according to claim 13, wherein the operation that the transmitter transmits the M-bit feedback information on the L first PUCCH resource(s) in the K first PUCCH resource(s) comprises that:
    the transmitter performs bit padding on the M-bit feedback information to obtain an information sequence with a length of Q bits when M is smaller than Q, and transmits the information sequence with the length of Q bits on the L first PUCCH resource(s) in the K first PUCCH resource(s), wherein Q is a positive integer, and Q is a threshold value predetermined by a protocol or configured by the base station.

* * * * *